United States Patent Office 3,120,525
Patented Feb. 4, 1964

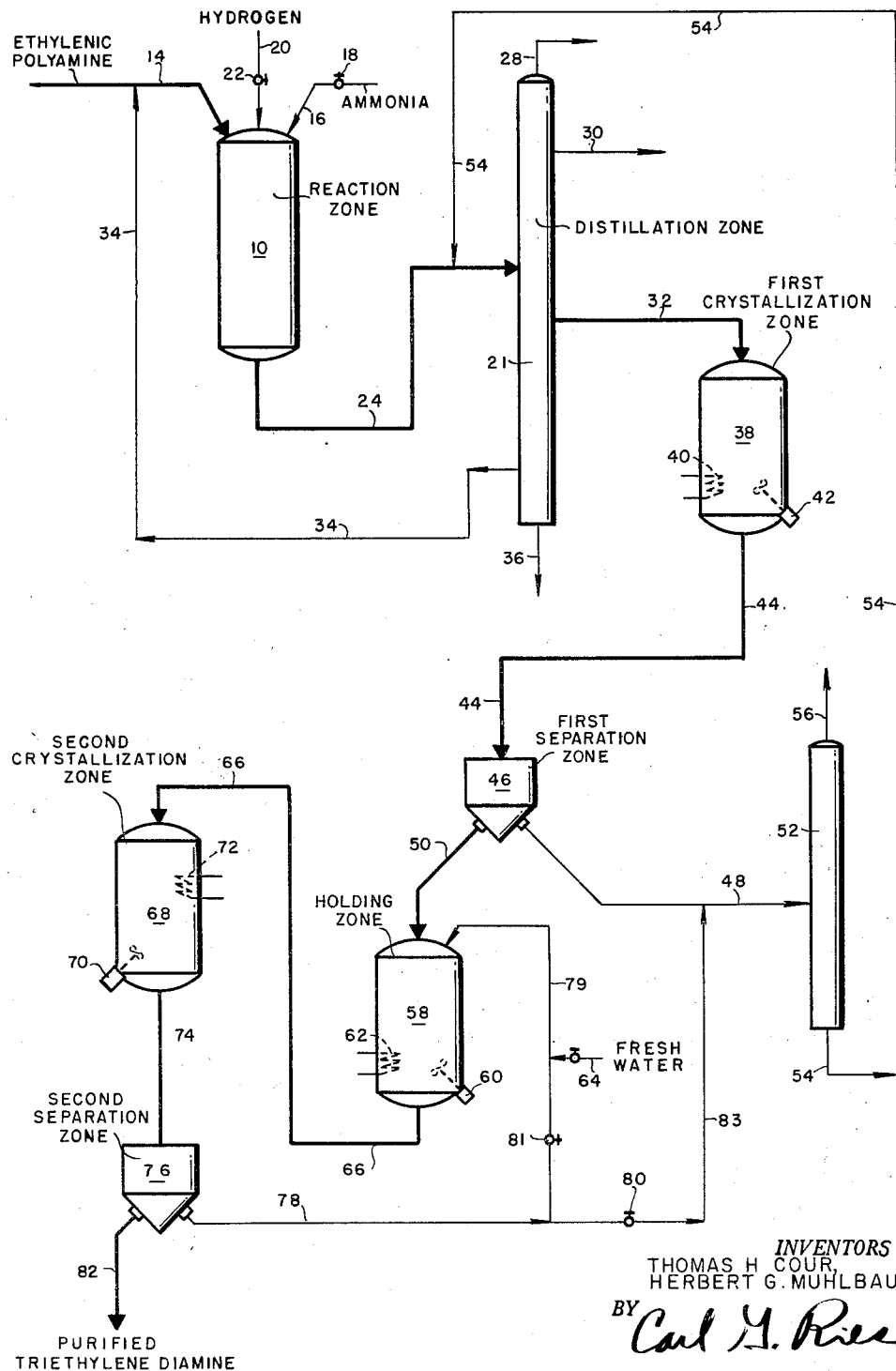

3,120,525
PURIFICATION OF AMINES
Herbert G. Muhlbauer and Thomas H. Cour, Austin, Tex., assignors to Jefferson Chemical Company, Inc., Houston, Tex., a corporation of Delaware
Filed May 18, 1961, Ser. No. 111,021
4 Claims. (Cl. 260—268)

This invention relates to the recovery of a purified amine. More particularly, this invention relates to the recovery of purified triethylenediamine from products obtained by catalytic cyclization of an ethylenic polyamine.

The compound triethylenediamine (diazabi-cyclo-octane) may be prepared from an ethylenic polyamine such as N-aminoethylpiperazine, ethylenediamine, diethylenetriamine, triethylenetetramine, tetraethylenepentamine, etc., or a mixture thereof. See, for example, United States Patent No. 2,950,282, entitled "Method for Separation and Recovery of Diazabicyclo-Octane," and co-pending application Serial No. 111,016, filed of an even date herewith and entitled "Combination Process."

As demonstrated by the foregoing patent and patent application and similar publications, comparatively severe catalytic conditions are required to promote the cyclization that is necessary when the desired product is triethylenediamine. Thus a wide variety of side reactions normally occur, including cracking reactions and condensation reactions that lead ultimately to the formation of a wide variety of either acyclic or heterocyclic by-products. Thus, triethylenediamine, even under the best of circumstances, will normally appear in the liquid amine products of the reaction in an amount varying from as little as about 5 wt. percent up to not more than about 35 wt. percent. Moreover, the impurities and by-products formed by the cyclization reaction will have chemical and physical properties closely related to the properties of triethylenediamine, whereby purification of the triethylenediamine is accomplished only with great difficulty. Thus, side reaction by-products frequently boil in approximately the same boiling range as triethylenediamine whereby the triethylenediamine is recovered from the reaction products by distillation only with great difficulty.

In contrast to the foregoing, a method has now been surprisingly discovered for recovering triethylenediamine with comparative ease in high purity wherein the triethylenediamine is recovered as the hexahydrate thereof.

By way of brief description, a reaction product is prepared by contacting an ethylenic polyamine of the group described above, such as aminoethylpiperazine, with a silica-alumina catalyst under cyclization conditions and is subjected to distillation in order to obtain a distillate fraction boiling within the range of about 160° to about 190° C. The distillate fraction is cooled to a temperature of about 65° C., or less, such as a temperature of about 10° to 40° C. (for example, about 25° C.) whereby a portion of the distillate fraction is crystallized to provide a slurry of crystals in a mother liquor consisting of the remaining components of the distillate fraction. Quite surprisingly, the crystals will contain in excess of about 90 wt. percent triethylenediamine and will comprise from about 40 to 50 wt. percent of the triethylenediamine present in the distillate fraction.

This first slurry is subjected to centrifugation to remove the solid triethylenediamine crystals from the mother liquor. The mother liquor, containing about 30 to 40 wt. percent of triethylenediamine is preferably fractionated to provide an overhead which is discarded from the system and a bottoms fraction rich in triethylenediamine that is preferably recycled to the distillation zone described above.

The crystalline triethylenediamine concentrate is added to a first holding zone wherein it is admixed with water in an amount sufficient to provide a mixture containing about 50 to 80 wt. percent of water. The temperature of the mixture is adjusted to a value within the range of about 0° to 40° C. sufficient to substantially completely dissolve the solids to thereby form an aqueous solution. The thus-prepared solution is then cooled to a temperature within the range of about 0° to 35° C. sufficient to form a precipitate. The precipitate will consist essentially of triethylenediamine hexahydrate. As a consequence, a slurry of triethylenediamine hexahydrate crystals in an aqueous mother liquor is formed. The slurry is centrifuged to provide a filter cake fraction consisting essentially of triethylenediamine hexahydrate and a filtrate fraction containing not only water but also about 30 to 40 wt. percent of triethylenediamine. The aqueous filtrate fraction is preferably recycled to the first holding zone.

The invention will be further illustrated in connection with the accompanying drawing wherein the single figure is a schematic flow sheet illustrating a preferred embodiment of the present invention.

Turning now to the drawing, there is shown a reactor 10 to which an ethylenic polyamine such as aminoethylpiperazine is charged by way of a line 14. Preferably, ammonia is also charged to reactor 10 by way of an ammonia charge line 16 controlled by a valve 18. If desired, hydrogen may also be added by way of a hydrogen charge line 20 controlled by a valve 22.

Within the reaction zone 10 the charge materials are brought into contact with a suitable catalyst such as a silica-alumina catalyst or a tungsten oxide catalyst, as disclosed in co-pending application Serial No. 110,891, now Patent No. 3,056,788, filed on even date herewith and entitled "Catalytic Synthesis of Heterocyclic Compound." As a consequence, at least a portion of the feed material will be converted to triethylenediamine. The crude reaction mixture is discharged from reactor 10 by way of a discharge line 24 leading to a fractionation zone 26 which is schematically shown in the drawing as a single distillation column. It will be understood that in actual practice, zone 26 will comprise a plurality of distillation towers, such as a plurality of splitter towers, equipped with appropriate reboilers, reboiler lines, reflux condensers, reflux lines, etc., in order to achieve effective distillation. Zone 26 is shown schematically since equipment necessary for the operation of zone 26 is commercially available and does not constitute a part of the present invention. Although any type of distillation may be employed, the distillation equipment in zone 26 is preferably distillation equipment designed for simple atmospheric operations.

Within the zone 26 the crude reaction product is separated into a variety of fractions, such as a light overhead fraction 28, a distillate fraction 30 rich in piperazine boiling in the range of about 135° to 160° C., a distillation fraction 32 rich in triethylenediamine and boiling within the range of about 160° to about 190° C., and N-aminoethylpiperazine fraction 34, boiling above about 190° C. which is preferably recycled to line 14 and a by-products residue fraction 36 which is preferably discarded from the system.

In accordance with the present invention, distillate fraction 32 is charged to a first holding zone 38 which is preferably equipped with suitable heat control means 40 and suitable agitating means 42 such as an impeller. Within the first holding zone 38 the distillation fraction 32 is cooled to a temperature of about 20° to 30° C. in order to selectively precipitate triethylenediamine. As a consequence, a slurry of crystals rich in triethylenediamine in a mother liquor comprising the rest of the distillate fraction 32 is formed. The slurry is discharged from zone 38 by way of a line 44 leading to a first separation zone 46 which is preferably a centrifugation zone. It will be understood that zone 46 may also be a decantation zone or a filtration zone, if desired.

Within the zone 46, the slurry 44 is separated into a filtrate fraction discharged by way of a line 48 and a filter cake fraction discharged by way of a conduit 50.

The filtrate fraction 48 will contain triethylenediamine and close boiling by-products, such as piperazine and N-ethylpiperazine, etc. Filtrate fraction 48 is therefore preferably charged to a splitter column 52, wherein filtrate fraction 48 is separated into a bottoms fraction 54 rich in triethylene diamine which is preferably recycled to distillation zone 26 and a distillate fraction 56 containing piperazine and N-ethylpiperazine which is preferably discarded from the system.

The filter cake fraction 50 is charged to a holding zone 58 equipped with suitable agitating means, such as an impeller 60 and suitable heat control means such as a coil 62. Fresh water is charged to second holding zone 58 by way of a water charge line 64 in an amount about equal to weight of filter cake 50. A recycle stream consisting of a water solution of triethylenediamine is added so that the composition of the mixture is about 58% water. The temperature within the zone 58 is adjusted to a temperature within the range of about 30° to about 40° C. in order to substantially completely dissolve the filter cake charged by way of line 50.

The resultant solution is discharged from zone 58 by way of a line 66 leading to a second crystallization zone 68 equipped with suitable agitating means such as impeller 70 and a cooling coil 72.

Within crystallization zone 68 the solution 66 is chilled to a temperature of about 20° to 30° C. to form a slurry of crystalline triethylenediamine hexahydrate in water. The resultant aqueous slurry is discharged by way of a line 74 leading to a second centrifuge 76 wherein the slurry is resolved into an aqueous filtrate fraction discharged by way of a line 78 and a solid triethylenediamine hexahydrate fraction which is discharged by way of a line 82. Aqueous filtrate is ordinarily recycled from line 78 to holding zone 58 by means of valve 81, but may be recycled by means of line 83 controlled by valve 80 to distillation zone 52 to remove impurities which may accumulate in filtrate 78.

Although the triethylenediamine hexahydrate discharged by way of line 82 is suitable for use, it may sometimes be desirable to obtain substantially pure triethylenediamine therefrom. This is conveniently accomplished by charging the hexahydrate to a fractionation zone (not shown) wherein it is heated to a temperature in excess of about 174° C. in order to provide a liquid triethylenediamine bottoms fraction and an aqueous overhead fraction.

The invention will be further illustrated by the following examples, which are given by way of illustration and not as limitations on the scope of this invention.

EXAMPLE I

*Crystallization and Separation of Triethylenediamine From a Crude Material Having a Boiling Range of 160° to 190° C.*

A crude triethylenediamine fraction having a boiling range of 160° to 190° C. was obtained from the first distillation zone 26. This fraction, containing between 60% to 75% triethylenediamine, was charged to a small agitated kettle equipped with a heating and cooling coil. The temperature of the material in the kettle was raised to about 70° C. As soon as all solids had dissolved, the temperature was slowly lowered, with agitation, to about 25° C. When crystallization was complete at this temperature, the slurry was fed to a centrifuge where the mother liquor was separated from impure triethylenediamine crystals. The operation is summarized in the following table:

TABLE I

| Stream | Wt., Grams | Wt. percent TEDA |
|---|---|---|
| Feed to crystallizer 160–190° C. boiling range | 1,180.5 | 63.0 |
| Product: TEDA crystals | 484 | 99.0 |
| Mother liquor | 682 | 37.3 |

EXAMPLE II

*Purification of Triethylenediamine by Recrystallization as Triethylenediamine Hexahydrate From a Water Solution*

Crude triethylenediamine (95–99% TEDA) obtained from the crystallization of triethylenediamine from a crude fraction having a boiling range of 160° to 190° C. was charged to a small agitated kettle equipped with heating and cooling coils. Water in an amount equal to 96% of the weight of triethylenediamine was added along with enough recycle mother liquor (saturated water solution of TEDA) to obtain a system containing 58.2% water. The mixture was heated to about 40° C. to dissolve all solids. When a clear solution was obtained, the mixture was slowly cooled, with agitation, to 25° C. When crystallization was complete at this temperature, the slurry was charged to a centrifuge where the mother liquor was separated from the triethylenediamine hexahydrate crystals. The mother liquor was recycled as needed to the next batch. The following table summarizes this operation:

TABLE II

| Stream | Wt., Grams | Wt. percent TEDA |
|---|---|---|
| Charge: | | |
| Crude TEDA crystals | 350 | 98.3 |
| Fresh Water | 335 | 0 |
| Recycle mother liquor | 1,030 | 35.0 |
| Recovered: | | |
| Product-Triethylenediamine Hexahydrate | 635 | 51.0 |
| Mother liquor | 1,007 | 35.0 |

EXAMPLE III

*Recycling Mother Liquor Obtained From the Crystallization of Triethylenediamine From a Crude Fraction Boiling in the Range 160° to 190° C.*

In order to recover the triethylenediamine present in the mother liquor obtained from the first separation zone 46, the mother liquor must be recycled to the first distillation zone 26. However, since this mother liquor contains an appreciable amount of impurities boiling below but close to triethylenediamine, a distillation step is needed to prevent a build-up of these impurities.

This distillation was carried out at atmospheric pressure and at a reflux ratio of 5:1 in a laboratory batch distillation column. An overhead fraction having a boiling range of 140° to 170° C. was found to contain most of the impurities boiling below triethylenediamine. The following is a summary of this operation:

TABLE III

| Stream | Wt., Grams | Wt. percent TEDA |
|---|---|---|
| Charge: Mother liquor | 661 | 37.3 |
| Overhead 140–170° C | 128 | 22.0 |
| Bottoms | 525 | 41.6 (by diff.) |

Vapor-liquid chromatographic analysis of the mother liquor is set forth in Table IV, and analyses of the overhead fraction and bottoms fraction is given in Tables V and VI.

TABLE IV
Mother Liquor

| Compound: | Weight percent |
|---|---|
| H₂O | 0.3 |
| Piperazine | 5.9 |
| N-ethylpiperazine | 10.4 |
| Triethylenediamine | 37.3 |
| N-aminoethylpiperazine | 6.6 |
| Others (heavies) | 40.0 |
| Total | 100.5 |

TABLE V
Overhead Fraction

| Compound: | Weight percent |
|---|---|
| Water | 5.0 |
| Monoethanolamine | 0.3 |
| N-methylpiperazine | 0.3 |
| Piperazine | 21.3 |
| N-ethylpiperazine | 29.9 |
| Triethylenediamine | 22.1 |
| Diethylenetriamine | 0.4 |
| N-hydroxyethylpiperazine | 0.2 |
| Others | 20.5 |
| Total | 100.0 |

TABLE VI
Bottoms Fraction

| Compound: | Weight percent |
|---|---|
| N-methylpiperazine | 0.1 |
| Piperazine | 0.2 |
| N-ethylpiperazine | 0.9 |
| Triethylenediamine | 37.3 |
| N-aminoethylpiperazine | 9.0 |
| N-hydroxyethylpiperazine | 1.6 |
| Heavies (by difference) | 54.0 |
| Total | 100.0 |

What is claimed is:

1. A method of preparing triethylenediamine hexahydrate which comprises the steps of dissolving an impure triethylenediamine feed stock containing from about 95 to about 99 weight percent of triethylenediamine in from about 50 to about 80 wt. percent of water at a temperature within the range of about 0° to about 40° C. to form a solution, cooling the solution to a temperature of at least about 35° C. sufficient to form a precipitate consisting essentially of triethylenediamine hexahydrate and recovering said triethylenediamine hexahydrate.

2. In a method wherein a normally liquid amine reaction product is obtained by catalytic cyclization of an ethylenic polyamine, the improvement which comprises distilling said reaction product to obtain a fraction boiling within the range of about 160° to about 190° C. and rich in triethylenediamine, adjusting the temperature of said fraction to a temperature within the range of about 20° to about 50° C. sufficient to form a slurry comprising a crystalline precipitate consisting primarily of triethylenediamine and a mother liquor comprising the remaining components, recovering said precipitate from said slurry to thereby provide impure triethylenediamine containing from about 95 to about 99 weight percent of triethylenediamine, dissolving said crude triethylenediamine in from about 50 to about 80 wt. percent of water at a temperature within the range of about 0° to about 40° C. to form an aqueous solution, cooling said aqueous solution to a temperature of at least 35° C. sufficient to form a precipitate consisting essentially of triethylenediamine hexahydrate and recovering said hexahydrate.

3. A method for recovering triethylenediamine from a normally liquid amine reaction product obtained by the catalytic cyclization of an ethylenic polyamine and comprising triethylenediamine, piperazine and N-ethylpiperazine, which comprises the steps of:
 (1) fractionally distilling said reaction product in a first distillation zone to obtain a distillate fraction boiling within the range of about 160° to about 190° C., rich in triethylenediamine and contaminated with piperazine and N-ethylpiperazine;
 (2) adjusting the temperature of said fraction to a temperature within the range of about 20° to about 50° C., sufficient to form a slurry composed of a crystalline precipitate consisting primarily of triethylenediamine, and a mother liquor comprising uncrystallized triethylenediamine, piperazine and N-ethylpiperazine;
 (3) recovering said precipitate from said slurry to obtain thereby an impure triethylenediamine containing from about 90 to about 99 weight percent of triethylenediamine;
 (4) dissolving said impure triethylendiamine in from about 50 to about 80 weight percent water, to provide an aqueous solution;
 (5) adjusting the temperature of said aqueous solution to a temperature of within the range of about 0° to 35° C., sufficient to form a precipitate, whereby a precipitate is formed consisting of triethylenediamine hexahydrate.
 (6) recovering said triethylenediamine hexahydrate;
 (7) subjecting said mother liquor to fractional distillation in a second distillation zone to obtain a distillate fraction containing substantially all of the N-ethylpiperazine in the mother liquor fraction and a bottoms fraction; and
 (8) recycling said bottoms fraction to said first distillation zone.

4. A method for obtaining triethylenediamine substantially free from piperazine from a feed stock containing triethylenediamine and a lesser amount of piperazine, which comprises the steps of dissolving said feed stock in from about 50 to about 80 weight percent of water to form a homogeneous solution, cooling said solution to a temperature below 35° C. sufficient to form a precipitate and recovering said precipitate, said precipitate consisting essentially of triethylenediamine hexahydrate and being substantially free from piperazines.

References Cited in the file of this patent
UNITED STATES PATENTS

| 2,950,282 | Farkas | Aug. 23, 1960 |
| 3,045,018 | Mascioli | July 17, 1962 |

FOREIGN PATENTS

| 678,537 | Great Britain | Sept. 3, 1952 |

OTHER REFERENCES

Farkas et al.: Journal Chemical and Engineering Data, volume 4, No. 4, page 334 (1959).

Bertholet: Ann. Chim., 7th Series, volume 20, pages 163–188 (1900).